United States Patent
Vajravel

(10) Patent No.: US 10,536,559 B2
(45) Date of Patent: Jan. 14, 2020

(54) BLOCKING AN INTERFACE OF A REDIRECTED USB COMPOSITE DEVICE

(71) Applicant: Dell Products L.P., Round Rock, TX (US)

(72) Inventor: Gokul Thiruchengode Vajravel, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 558 days.

(21) Appl. No.: 15/073,472

(22) Filed: Mar. 17, 2016

(65) Prior Publication Data
US 2017/0272546 A1    Sep. 21, 2017

(51) Int. Cl.
| H01L 29/06 | (2006.01) |
| H04L 29/08 | (2006.01) |
| H04L 29/06 | (2006.01) |

(52) U.S. Cl.
CPC ............ *H04L 67/42* (2013.01); *H04L 67/025* (2013.01); *H04L 67/142* (2013.01)

(58) Field of Classification Search
CPC ......... H04L 67/42; H04L 63/10; H04L 47/20; G06F 9/4406; G06F 9/4411; H04W 88/04
See application file for complete search history.

(56) References Cited

U.S. PATENT DOCUMENTS

| 2004/0221044 | A1* | 11/2004 | Rosenbloom | H04L 29/06 709/227 |
| 2005/0091388 | A1* | 4/2005 | Kamboh | H04L 12/2856 709/228 |
| 2007/0233869 | A1* | 10/2007 | Jodh | H04L 63/10 709/226 |
| 2013/0297792 | A1* | 11/2013 | Kaushik | H04L 63/10 709/225 |
| 2016/0099948 | A1* | 4/2016 | Ott | G06F 9/54 |
| 2016/0234258 | A1* | 8/2016 | Darbha | H04L 67/141 |
| 2017/0013016 | A1* | 1/2017 | Wong | H04L 63/20 |

OTHER PUBLICATIONS

VMware, "USB Device Redirection, Configuration, and Usage in VMware Horizon with View", 2014, VMware. (Year: 2014).*
VMpro, "USB Device Redirection in VMware Horizon View 5.1 and 5.2" Mar. 23, 2013, VMpro. (Year: 2013).*
Nelson, Trent, "winsdk-10/include/10.0.10240.0/shared/devpkey.h", Oct. 15, 2015, Github. (Year: 2015).*

* cited by examiner

*Primary Examiner* — Kamal B Divecha
*Assistant Examiner* — Eui H Kim
(74) *Attorney, Agent, or Firm* — Kirton McConkie; Brian Tucker

(57) ABSTRACT

Session level restrictions can be implemented to limit access to a redirected interface of a composite device. These session level restrictions can be defined within a policy of a directory service, such as Active Directory, to facilitate the dynamic application of the restrictions to the appropriate remote sessions. In this way, access restrictions can be applied to individual interfaces of a redirected composite device so that a particular interface will only be accessible from specified remote sessions.

20 Claims, 15 Drawing Sheets

900

901

In Response To A First Device Stack Being Created For A First Interface Of A Composite Device That Is Redirected To The Server, Determine, By A Filter Driver On The First Device Stack, That The First Interface Is Redirected To The Server

902

Access A Policy Applicable To A Session Over Which The First Interface Is Redirected To Determine That The First Interface Is Prohibited From Redirection

903

Assign An Invalid Session ID To A Session ID Property Of A Device Object Representing The First Interface Such That The First Interface Will Not Be Accessible Within Any Valid Session On The Server

BLOCKING AN INTERFACE OF A REDIRECTED USB COMPOSITE DEVICE

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client terminal accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1, 2A and 2B and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2A is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2A. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a user session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a user session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2A. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a user session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

The Object Manager Namespace (OMN) stores information on symbolic links created for use by operating system 170, including symbolic links for devices and for applications running on server 104. The Object Manager Namespace generally includes several different namespaces for storing symbolic link information for applications and devices. For example, the Object Manager Namespace can include namespaces such as: a "Global" namespace used to store symbolic link information for devices and applications that are shared by all user sessions running on server 104; various "Local" namespaces, each associated with a user session running on server 104, used to store information for applications used by (and restricted to) the associated user session; and a "Device" namespace used to store device object names of devices and virtual devices accessible by server 104. A "Global" namespace may be referred to as a global namespace. A "Local" namespace may be referred to as a local namespace. A "Device" namespace may be referred to as a device namespace.

As described herein, symbolic links can be stored in a global namespace or a local namespace. Symbolic links stored in a global namespace may be available to the entire system (i.e., to all user sessions running on server 104), while symbolic links stored in a local namespace may only be seen and accessed by the session for which they are created. For example, "\\GLOBAL??\c:" may be a symbolic link stored in a global namespace. "\Device\HarddiskVolume1" may be a device object name stored in a device namespace. A symbolic link "\\GLOBAL??\c:" may be pointing to a device object having a device object name of "\Device\HarddiskVolume1". Because "c:" is a symbolic link in the global namespace directory, such a symbolic link may be accessed by the entire system, including all the users logged in through their respective user sessions. A user application can open "\\GLOBAL??\c:" or just "c:" to access the actual device.

In certain operating systems, such as the Windows operating system, the creation of the symbolic link for a device 240 results in an entry being created in a Global namespace of the Object Manager Namespace. Because the symbolic link is created in the Global namespace, the symbolic link can be accessed from any user session running on server 104. As a result, the device 240 associated with the symbolic link can be accessed from any user session on server 104, and/or from any client terminal having an active user session on server 104.

FIG. 2B illustratively shows a block diagram of a computer system 100 providing local device virtualization. As previously described in relation to FIG. 1, system 100 includes client terminals 102a-102n communicating through network 106 with server 104. As described in relation to FIG. 2A above, each device 240a, 240b can be virtualized on server 104 to provide access to the device from a user session on server 104 through a corresponding virtual device 290a, 290b. For example, when device 240a is connected to client terminal 102a, drivers for device 240a may be loaded in operating system 170 of server 104, device 240a may be virtualized on server 104 as virtual device 290a, and a symbolic link to the device 240a may be created in the Object Manager Namespace of operating system 170. Once the symbolic link is created, a user of client terminal 102a may be able to access device 240a through a user session on server 104. Similarly, when device 240b is connected to client terminal 102b, a symbolic link to the device 240b may be created in the Object Manager Namespace of operating system 170 of server 104. Once the symbolic link is created, a user of client terminal 102b may be able to access device 240b through a user session on server 104.

The symbolic links to the devices 240a, 240b are created in a Global namespace of the Object Manager Namespace of operating system 170. As a result, the symbolic links and associated devices can be accessed from and used by any user session running on server 104. For example, as illustratively shown in FIG. 2B, a user of client terminal 102a having a user session on server 104 may access both device 240a as well as virtual device 240b' from the user session. Similarly, a user of client terminal 102b having a user session on server 104 may access both device 240b as well as virtual device 240a' from the user session. Finally, a user of client terminal 102c having a user session on server 104 may access both virtual device 240a' and 240b' from the user session.

Hence, the device virtualization described in relation to FIGS. 2A and 2B provides unrestricted access to devices 240 connected locally to client terminals 102 from any user session on server 104. As such, a redirected device becomes a local device to the server and can be accessed by all the users' sessions connected to that server. For example a printer or a mass storage device, when redirected by one user connected through a session on the server, will show up as a local device and all the users can read/write the mass storage device and print using the printer.

This redirection process is implemented in a similar manner even when the redirected device is a USB composite device. A USB composite device (or simply "composite device") is a USB device that performs more than one type of function. More specifically, a composite device includes more than one device class. For example, a USB printer that also includes a scanner is a composite device since the printer functionality and the scanner functionality fall into different classes. In USB terminology, a composite device is generally referred to as providing multiple interfaces. In this sense, an individual interface of a composite device can be viewed in a similar manner as a single "non-composite" USB device.

Accordingly, when a composite device is connected to a client terminal and redirected to the server, each interface of the composite device is redirected and made available on the server. FIG. 3 illustrates an example of how this redirection of a composite device is implemented. FIG. 3 is substantially the same as FIG. 2A. However, in FIG. 3, a composite device 340 having two interfaces 340a, 340b is connected to client terminal 102. In response, and assuming redirection is enabled on client terminal 102, both interfaces 340a, 340b will be redirected to server 104.

In a similar manner as described above, a device stack 391a, 391b is created for each interface 340a, 340b respectively. It is noted that in many instances, a USB composite class driver (e.g., usbccgp.sys in the Windows implementations) can be employed as a lower level driver in each of device stacks 391a, 391b. However, even when this USB composite class driver is employed, two separate device stacks would still be created for the two interfaces of the composite device.

Device stack 391a comprises layered objects 394a-394n with corresponding drivers 395a-395n, and device stack 391b comprises layered objects 396a-396n with corresponding drivers 397a-397n. Each device stack functions in a similar manner as described above thereby causing virtual devices 390a, 390b corresponding to interfaces 340a, 340b respectively to appear as if they were locally connected to server 104. In this way, each of interfaces 340*a*, 340*b* will become accessible within any remote session established with server 104.

One problem that exists with this redirection technique is that there is no ability to prevent an individual interface of a composite device from being redirected. In other words, if a composite device is redirected, all interfaces of the composite device will be redirected and made accessible on server 104. For example, if an administrator desired to block the redirection of mass storage devices and a composite device includes a mass storage device interface, the only way to block the redirection of the mass storage device interface is to prevent all redirection (i.e., to prevent all interfaces of the composite device, including those that may be authorized, from being redirected). As a result, a user would be limited in the type of USB devices that he or she could employ.

BRIEF SUMMARY

The present invention extends to methods, systems, and computer program products for blocking an interface of a redirected USB composite device. By blocking an individual interface of the redirected USB composite device, the non-blocked interfaces may still be accessible on the server. This blocking of an individual interface can be performed entirely on the server side so that the client side redirection techniques can still be implemented in a traditional manner thereby facilitating the implementation of interface blocking in a number of different architectures.

To implement interface blocking, a filter driver can be loaded in the device stack that is created for a redirected interface. If a policy governing a remote session over which the interface is redirected indicates that the interface should not be redirected, the filter driver can take actions to prevent the interface from being accessible from any session on the server including any remote sessions. Therefore, even though the interface is redirected, it will not be accessible on the server; however, other interfaces of the composite device may still be redirected and accessible on the server.

In one embodiment, the present invention is implemented as a method, implemented by a filter driver of a device stack on a server with which a number of client terminals establish remote sessions, for blocking an individual interface of a redirected composite device. In response to a first device stack being created for a first interface of a composite device that is redirected to the server, a filter driver on the first device stack can determine that the first interface is redirected to the server. The filter driver can then access a policy applicable to a session over which the first interface is redirected to determine that the first interface is prohibited from redirection. To block the first interface from being accessible on the server, the filter driver can identify one or more symbolic links in a global object manager namespace that are associated with the first interface and move them to an object manager namespace associated with an invalid session.

In another embodiment, the present invention is implemented as a method, implemented by a filter driver of a device stack on a server with which a number of client terminals establish remote sessions, for blocking an individual interface of a redirected composite device. In response to a first device stack being created for a first interface of a composite device that is redirected to the server, a filter driver on the first device stack can determine that the first interface is redirected to the server. The filter driver can then access a policy applicable to a session over which the first interface is redirected to determine that the first interface is prohibited from redirection. To block the first interface from being accessible on the server, the filter driver can assign an invalid session ID to a session ID property of a device object representing the first interface such that the first interface will not be accessible within any valid session on the server.

In another embodiment, the present invention can be implemented as computer storage media storing computer executable instructions which when executed on a server implement a method for preventing an individual interface of a redirected composite device from being accessible on the server. In response to a first device stack being created for a first interface of a composite device that is redirected to the server, a first filter driver on the first device stack can determine that the first interface is redirected to the server. Similarly, in response to a second device stack being created for a second interface of the composite device that is redirected to the server, a second filter driver on the second device stack can determine that the second interface is redirected to the server. Both the first and second filter drivers can access a policy applicable to a session over which the first and second interfaces are redirected. The first filter driver can determine that the policy does not prohibit redirection of the first interface, and in response, allow the first interface to be redirected to the server via the first device stack. In contrast, the second filter driver can determine that the policy prohibits redirection of the second interface, and in response, either (1) assign an invalid session ID to a session ID property of a device object representing the second interface, or (2) move any symbolic link associated with the second interface to an object manager namespace associated with an invalid session.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 9 illustrates a flowchart of another example method for blocking an individual interface of a redirected composite device.

DETAILED DESCRIPTION

In this specification and the claims, the term "user session" or simply "session" represents a single user's logon session to a server. In a VDI environment, a number of users may establish remote sessions with a server using an appropriate remoting protocol. Also, a user may establish a session by directly logging in to the server. The term session should therefore be construed as encompassing both "remote" and "local" sessions.

Figure 1:
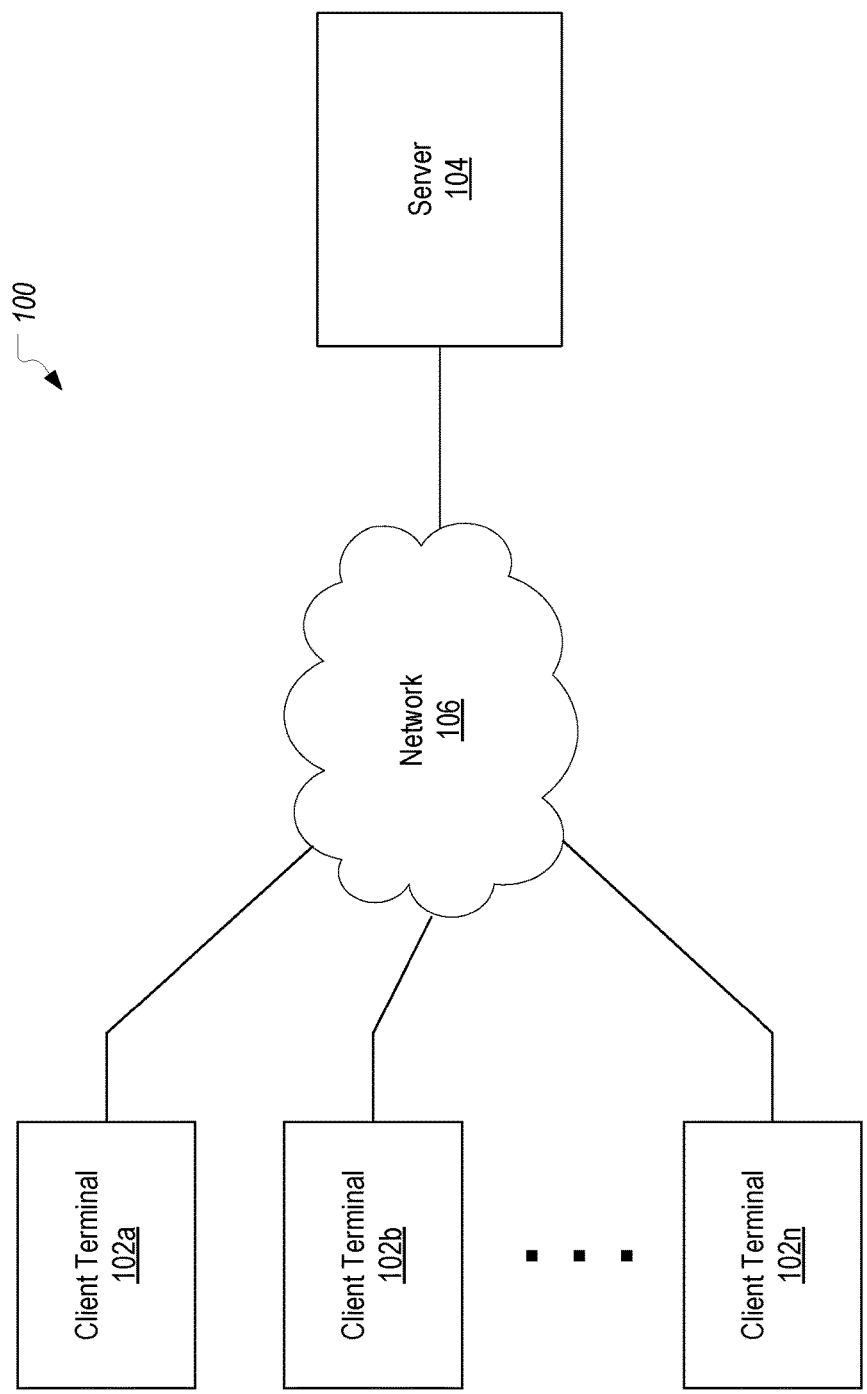
FIG. 1 illustrates an example computing environment in which the present invention can be implemented.
Figure 2A:
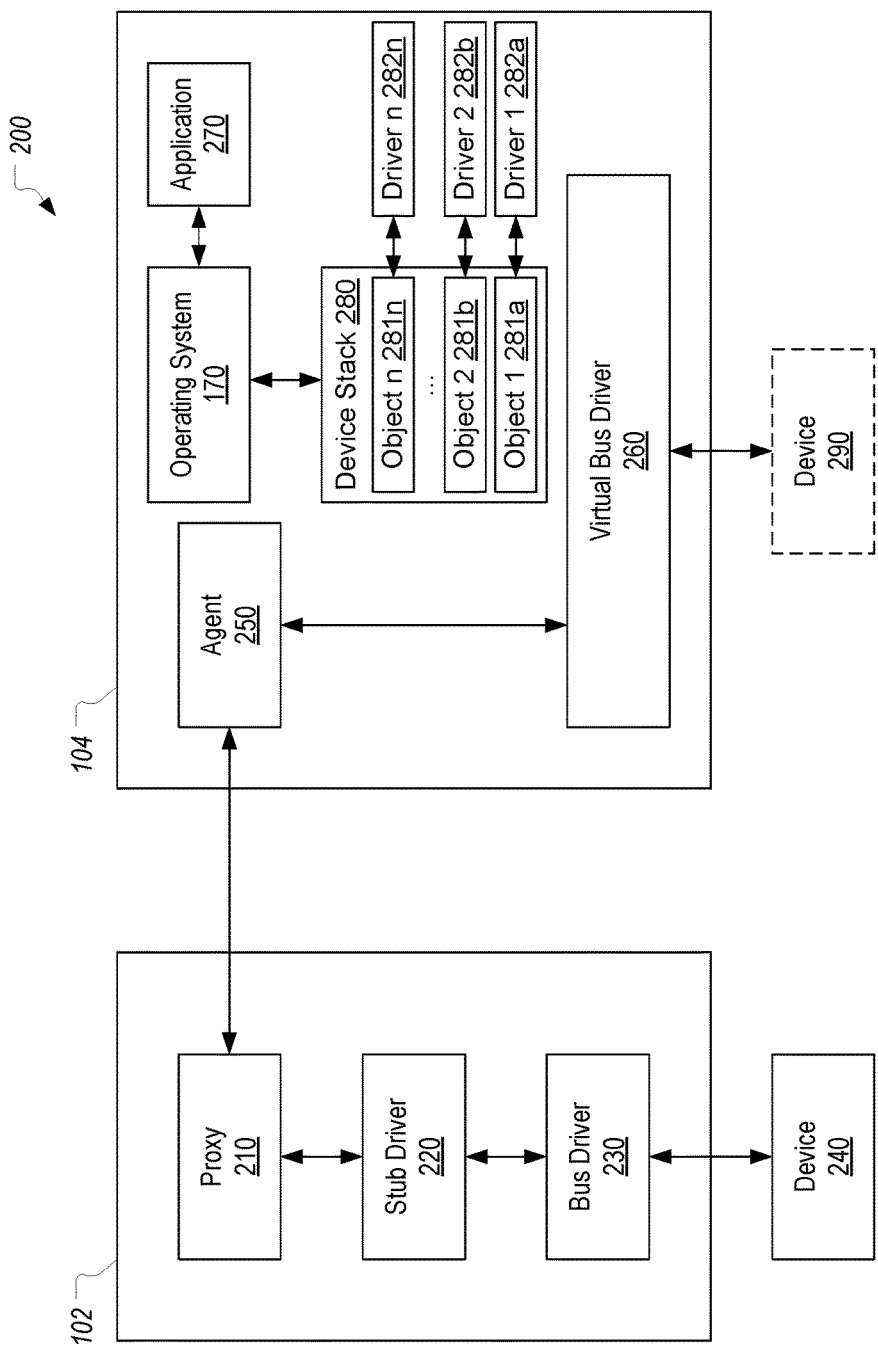
FIG. 2A illustrates how a USB device can be redirected from a client terminal to a server.
Figure 2B:
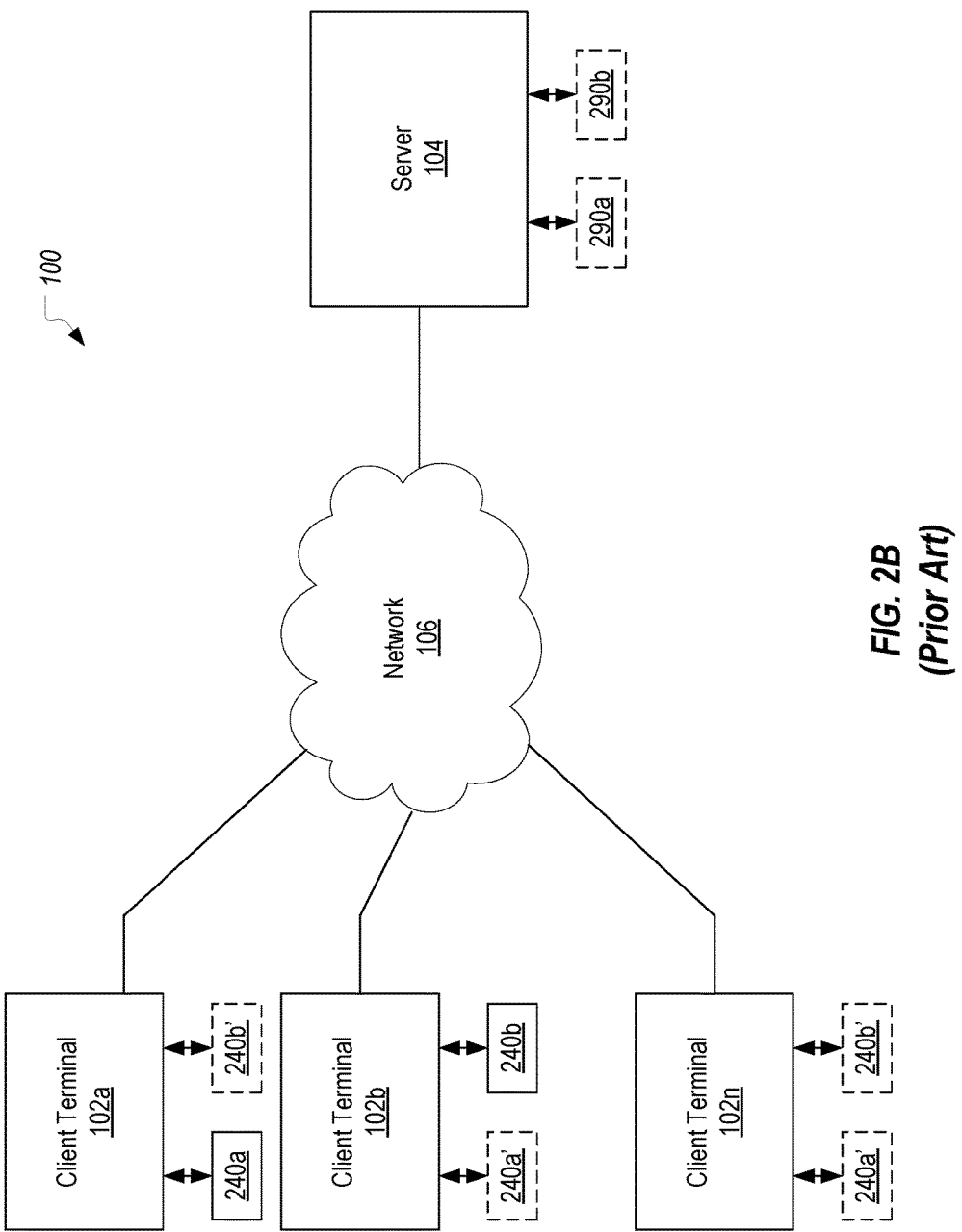
FIG. 2B illustrates how redirecting the USB device to the server can make the device accessible to any remote session established with the server.
Figure 3:
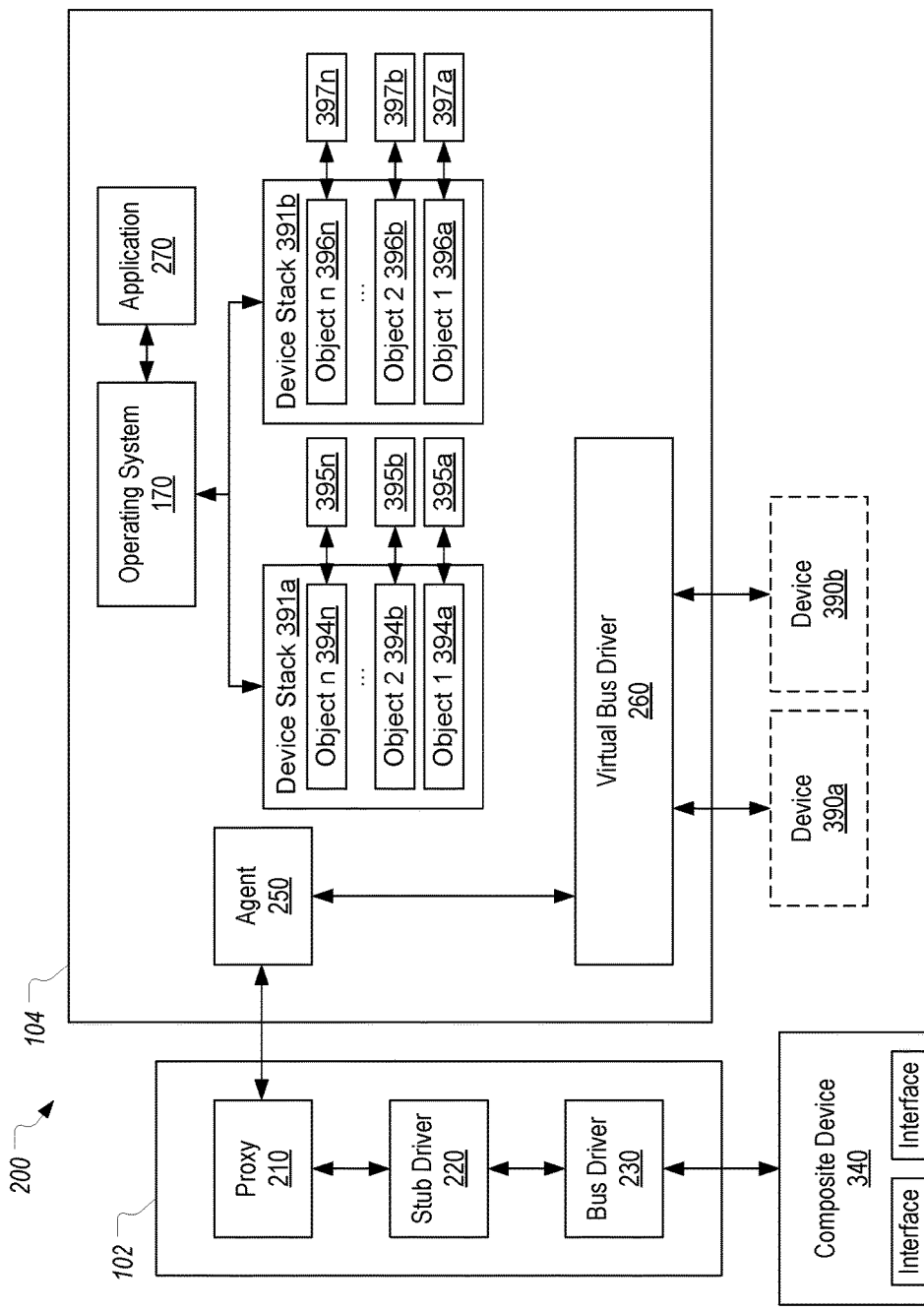
FIG. 3 illustrates how two interfaces of a composite USB device can be redirected to the server.
Figure 4:
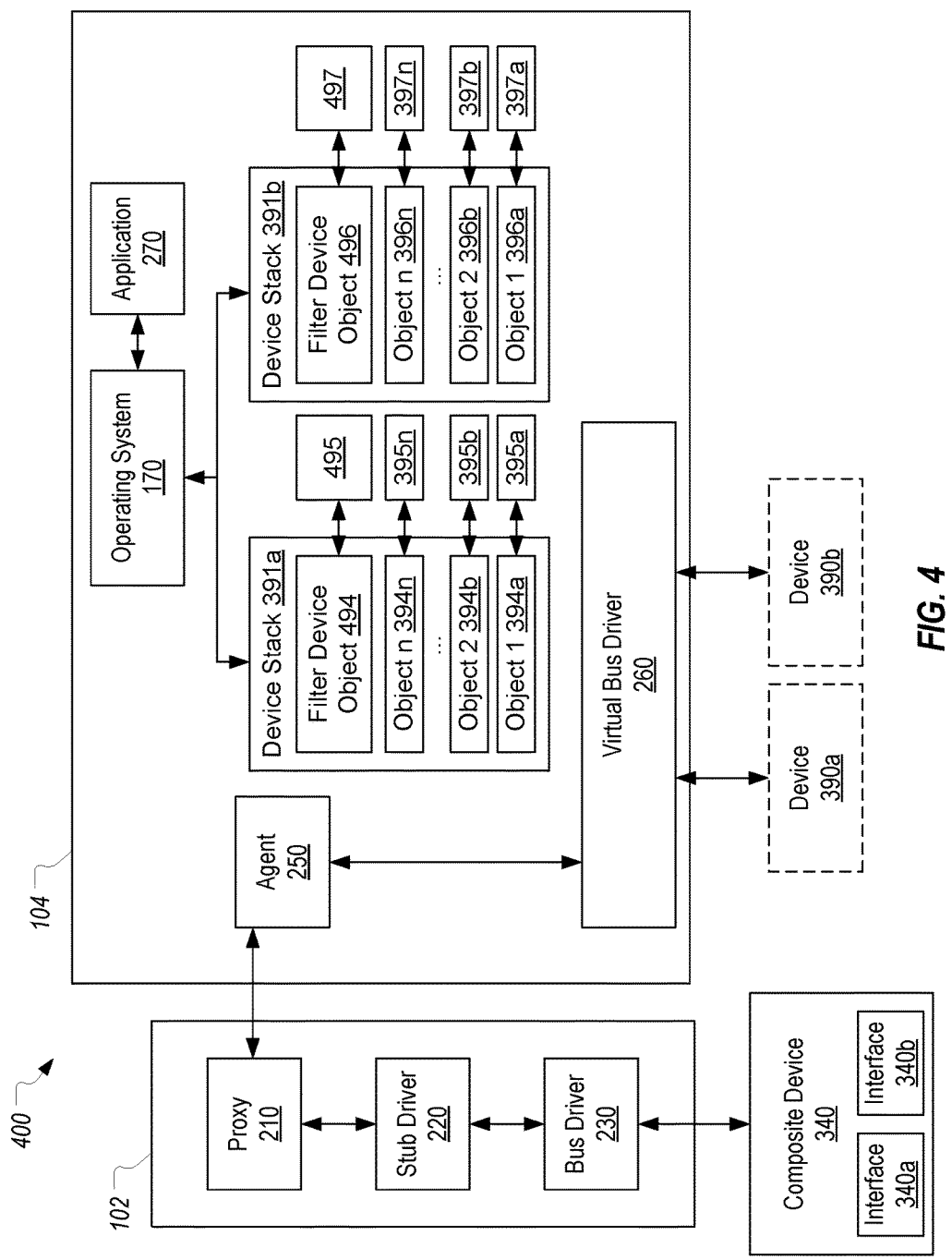
FIG. 4 illustrates that a filter driver and corresponding filter device object can be loaded on each device stack created for a redirected interface of a composite device to enable the filter driver to selectively block the redirected interface in accordance with an applicable policy.

FIG. 4 illustrates a computing system 400 that is configured in accordance with embodiments of the present invention. Computing system 400 includes similar components as system 200 depicted in FIG. 3. These similar components allow system 400 to perform USB device redirection in a similar manner as described above. Most notably, when a composite device 340 is connected to a client terminal 102, each interface 340a, 340b is redirected to server 104 resulting in device stacks 391a, 391b being created to manage access to these interfaces (i.e., to virtual devices 390a, 390b).

In contrast to what is shown in FIG. 3, device stacks 391a, 391b depicted in FIG. 4 also include filter device objects 494, 496 respectively along with their corresponding filter drivers 495, 497 respectively. As is known in the art, a filter driver can be defined which will be loaded when a corresponding USB device/interface is connected. For example, assuming interface 340a is a printer interface (e.g., a USB interface having a class code of "07h"), filter driver 495 could be registered with operating system 170 to be loaded when a printer interface/device is connected to server 104. Similarly, assuming interface 340b is a scanner interface (e.g., a USB interface having a class code of "06h"), filter driver 497 could be registered with operating system 170 to be loaded when a scanner interface/device is connected to server 104. Filter drivers 495, 497 can create filter device objects 494, 496 in device stacks 391a, 391b respectively.

Filter drivers 495, 497 can each be configured similarly to perform functionality to block its corresponding interface in accordance with a defined policy. For example, an Active Directory group policy object can be created which would define whether a particular remote session should be allowed to redirect a particular class of USB device/interface. Based on such a policy, filter drivers 495, 497 can selectively block an interface of a redirected composite device. In this way, other interfaces of the composite device that the policy may allow to be redirected may still be accessible.

FIGS. 5A-5E illustrate a process for how each of filter drivers 495, 497 can implement this blocking. For ease of illustration, each of FIGS. 5A-5E only depicts the components of computing system 400 that are directly relevant to the steps illustrated in the figure. However, for this example, it can be assumed that the other components of computing system 400 would be configured substantially as shown in FIG. 4 throughout the process. It will also be assumed that composite device 340 includes a printer interface 340a and a scanner interface 340b. In this example, printer interface 340a and virtual device 390a may be referred to interchangeably since virtual device 390a represents printer interface 340a on server 104. Similarly, scanner interface 340b and virtual device 390b may be referred to interchangeably since virtual device 390b represents scanner interface 340b on server 104.

FIGS. 5A-5E also depict a group policy object 601 which can represent any type of policy object of a directory service such as, for example, Active Directory. Group policy object 601 includes a policy setting 601a that defines that printer redirection should not be allowed in any session to which group policy object 601 pertains. It is noted that group policy objects similar to group policy object 601 exist in the prior art. However, as described in the Background, the prior art's application of such group policy objects to a composite device that includes a printer interface would prevent all interfaces of the composite device from being redirected. In particular, the prior art would apply this type of group policy object on the client terminal side to prevent the components on the client terminal from implementing USB redirection when the composite device includes a prohibited interface. In contrast, the present invention can implement techniques on the server side so that only the prohibited interface(s) of a redirected composite device are blocked while non-prohibited interface(s) are not.

Figure 5A:
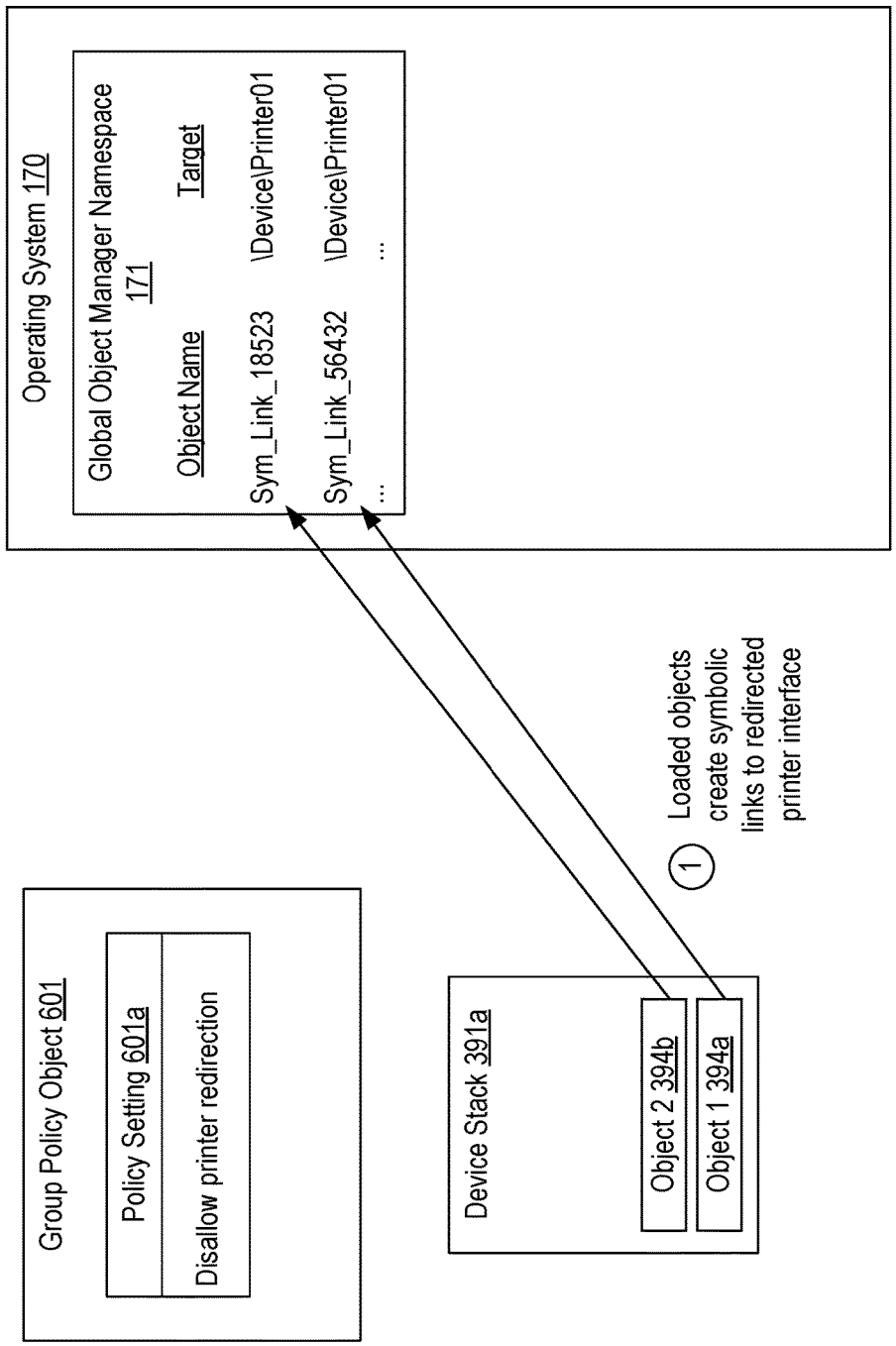
FIGS. 5A-5E illustrate a process by which a filter driver moves symbolic links associated with a prohibited redirected interface to a namespace associated with an invalid session.

Turning to FIG. 5A, a first step is depicted in which two device objects 394a, 394b of device stack 391a create symbolic links within global object manager namespace 171 of operating system 170. It is noted that the depiction of two symbolic links being created is exemplary only. Depending on the configuration of the drivers that are loaded when the USB device/interface is connected/redirected to server 104, only one or more than two device objects in device stack 391a may create symbolic links. In this example, these two symbolic links each define a path to virtual device 390a that represents redirected printer interface 340a. As was introduced in the Background, device objects that are added to a device stack may typically create a symbolic link to the physical device they represent. These symbolic links serve as the mechanism by which user mode applications can communicate with the kernel for purposes of accessing the actual device. Also, as addressed in the Background, if a symbolic link to a device is added to the global object manager namespace, any session on the server will be able to access the device. Accordingly, when server 104 is in the state depicted in FIG. 5A, virtual device 390a (and therefore printer interface 340a) would be accessible within any session on server 104. However, assuming group policy object 601 is applicable to the session over which printer interface 340a is redirected, this should not be the case. FIG. 5B-5E depict the steps that filter driver 495 can take to address this.

Figure 5B:
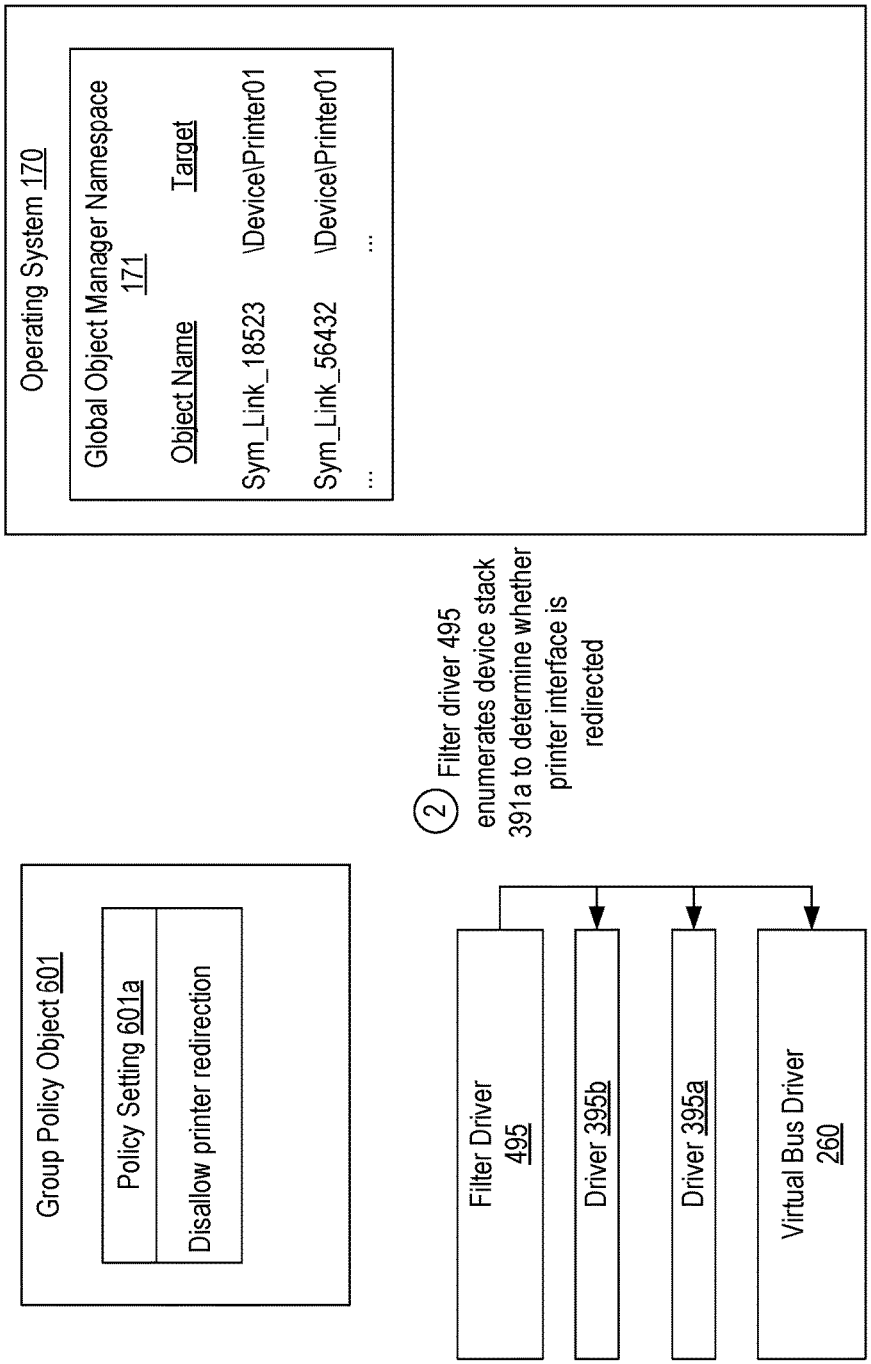

In FIG. 5B, it is assumed that filter driver 495 has been loaded (which may have already been the case in FIG. 5A). With filter driver 495 loaded, it can enumerate through the lower level drivers within device stack 391a to identify whether virtual device 390a represents a redirected device/interface. This determination can be made by identifying whether virtual bus driver 260 is present at the bottom of device stack 391a. In other words, if a printer interface had been directly connected to server (as opposed to being redirected from client terminal 102), virtual bus driver 260 would not be present in device stack 391a. Therefore, the presence of virtual bus driver 260 can inform filter driver 495 whether it will be necessary to evaluate whether virtual device 390a should be blocked.

Figure 5C:
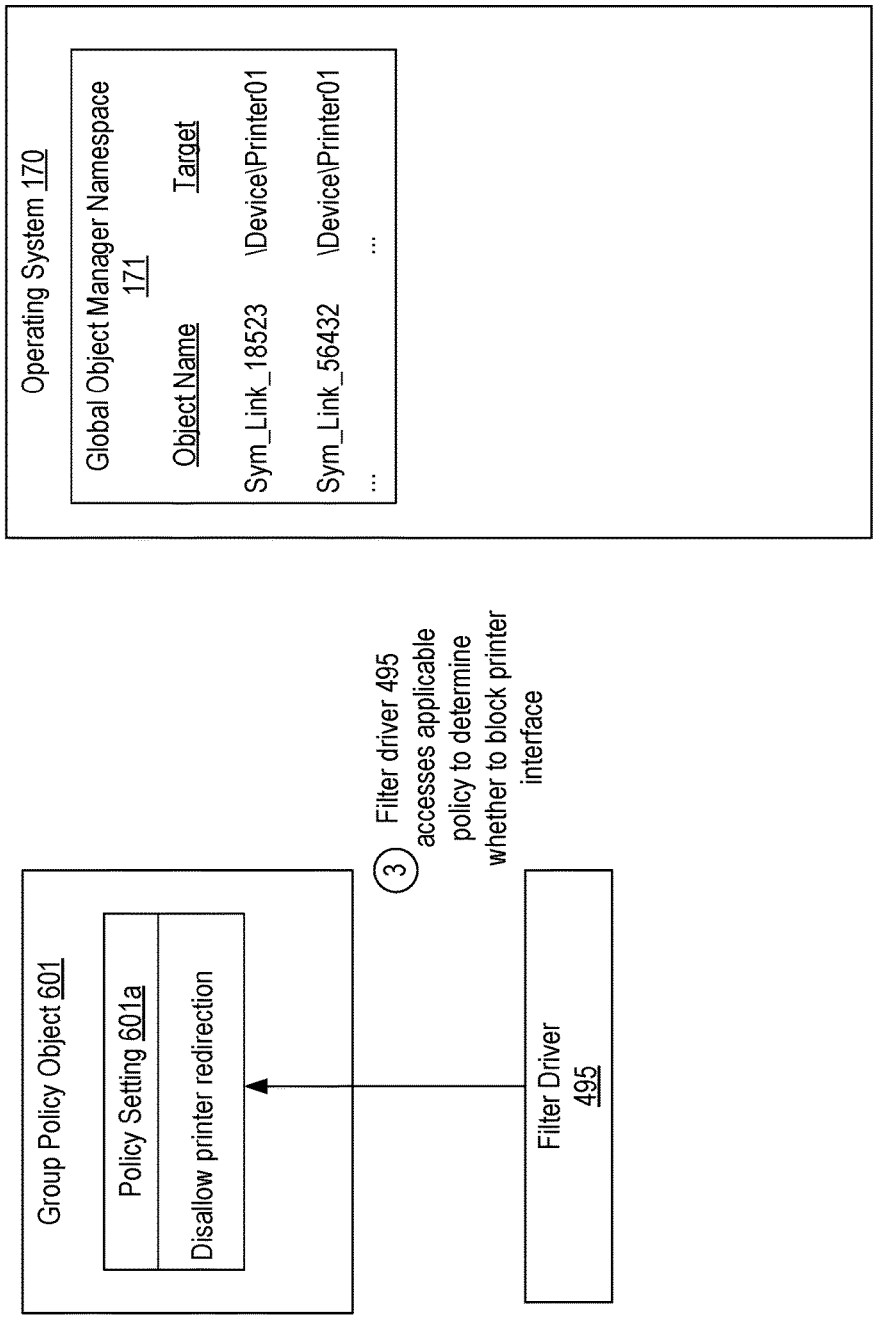
Figure 5D:
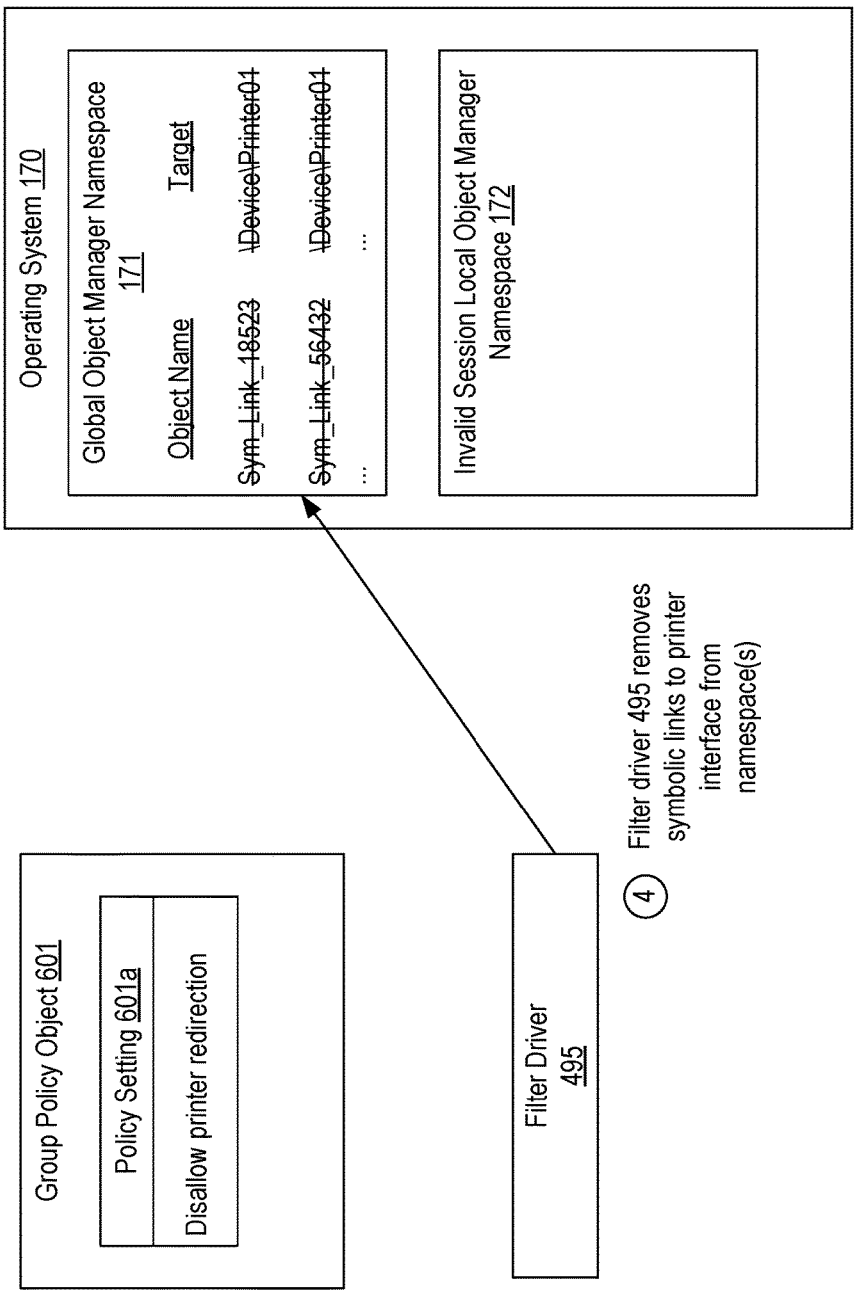
Figure 5E:
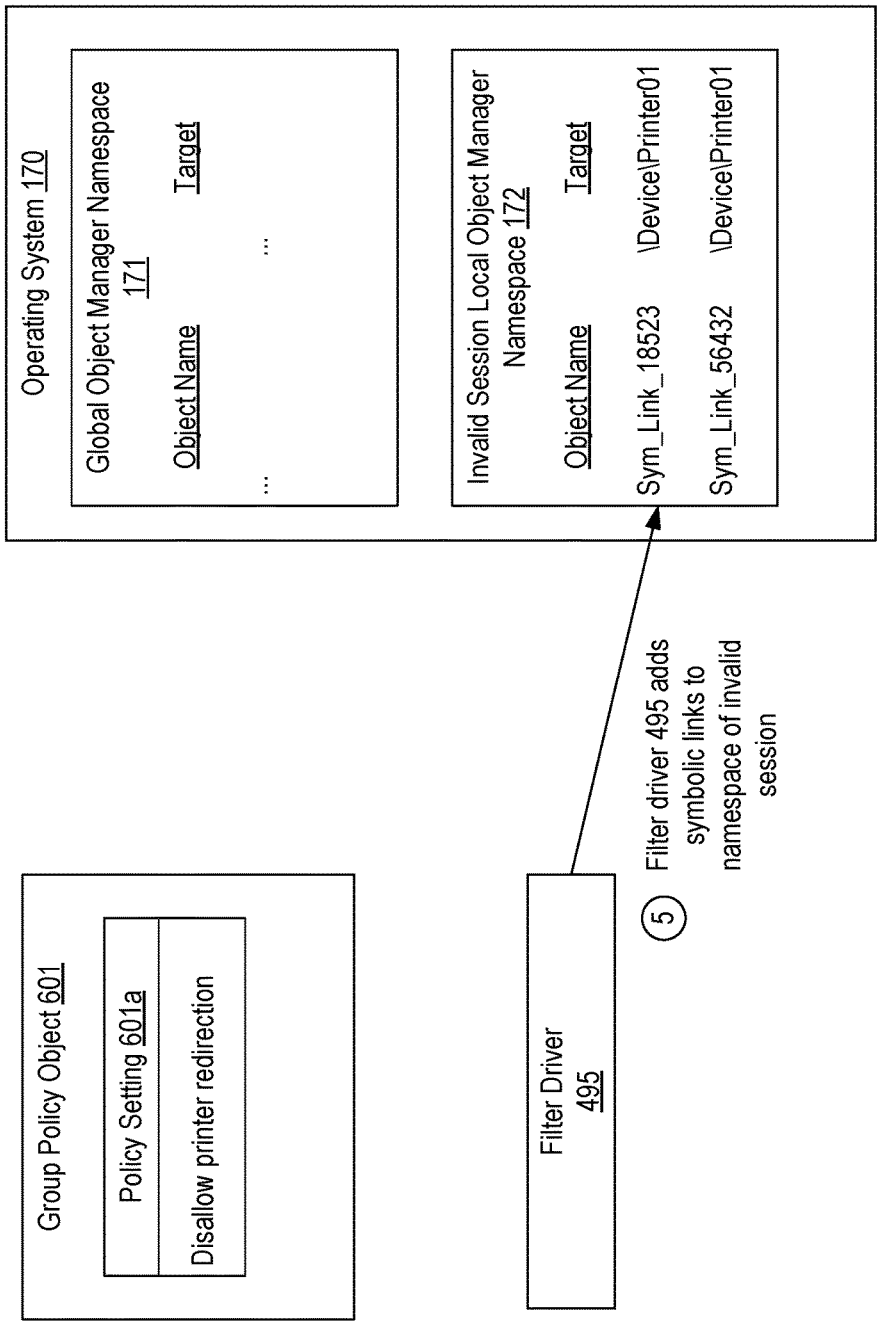

In FIG. 5C, because filter driver 495 determines that virtual device 390a represents a redirected interface/device due to the presence of virtual bus driver 260, filter driver 495 can then determine whether access to virtual device 390a should be blocked. This determination can be made by evaluating any policies that are applicable to the session over which printer interface 340a is redirected. In this example, it will be assumed that group policy object 601 is applicable. Therefore, because group policy object 601 includes a policy setting 601a that disallows printer redirection, filter driver 495 can determine that virtual device 390a should not be accessible on server 104. FIGS. 5D and 5E depict how filter driver 495 can block virtual device 390a (and therefore block printer interface 340a).

In FIG. 5D, filter driver 495 is shown as accessing global object manager namespace 171 to delete each symbolic link that was created for virtual device 390a. In Windows implementations, this can be accomplished by calling IoDeleteSymbolicLink using the name of the symbolic link as the parameter (e.g., IoDeleteSymbolicLink(Sym_Link_18523) and IoDeleteSymbolicLink(Sym_Link_56432)). Filter driver 495 can identify symbolic links that were created for virtual device 390a in any suitable manner. For example, filter driver 495 may identify each symbolic link having a target identifying virtual device 390a which in this case is assumed to have an object name of \Device\Printer01. Alternatively or additionally, filter driver 495 may enumerate each object in device stack 391a to identify handles to any symbolic links. Although it is not shown in FIG. 5D, filter driver 495 may also identify and delete any symbolic links that were created for virtual device 390a in any other object manager namespaces such as within any local object manager namespace.

In addition to deleting the symbolic links, filter driver 495 can add the same symbolic links to a local object manager namespace 172 of an invalid user session as shown in FIG. 5E. The combination of deleting the symbolic links from valid namespaces and added them to an invalid namespace in effect moves the symbolic links into a namespace where they will not be accessible to any session. In other words, local object manager namespace 172 can represent a namespace of a user session that is not associated with any currently valid user session. Therefore, even though the symbolic links will still exist, they will not be visible to any user having a session on server 104.

In some embodiments of the present invention, filter driver 495 can be configured to create local object manager namespace 172 for the purpose of storing symbolic links to interfaces that are restricted from redirection. For example, in the Windows operating system, the Object Manager defines a hierarchical arrangement of namespaces. This hierarchy typically includes a Sessions directory within which the various session (or local) namespaces are contained. Filter driver 495 may be configured to create local object manager namespace 172 within this session directory having a name or identifier that would not match any valid session.

Although not depicted in these figures, scanner interface 340b can be redirected in a similar manner as described above. However, assuming that no group policy object prevents the redirection of a scanner device/interface over the session, filter driver 497 will not move symbolic links to virtual device 390b into an invalid namespace. Therefore, scanner interface 340b is redirected and made accessible on server 104 while printer interface 340a is blocked. In this way, the present invention allows individual interfaces of a redirected composite device to be selectively blocked.

Because filter device object 494 is present in device stack 391a, it will receive any communications pertaining to virtual device 390a. For example, if composite device 340 is disconnected, filter device object 494 will be notified thereby enabling filter driver 495 to take appropriate action to remove the symbolic links from local object manager namespace 172 (e.g., via the IoDeleteSymbolicLink function). In some embodiments, filter driver 495 may also take appropriate action to delete local object manager namespace 172 when composite device 340 is disconnected.

It is reiterated that this technique for blocking an individual interface of a redirected composite device can be implemented independently of the client side functionality and with minimal impact on the server side functionality. For example, from the client perspective, both printer interface 340a and scanner interface 340b are redirected to server 104. However, only scanner interface 340b is accessible. Also, because the symbolic links to printer interface 340a are moved to an invalid namespace, printer interface 340a will not even be accessible within the session over which it is redirected. In essence, it will appear to the client as if only scanner interface 340b is being redirected even though the client is redirecting both interfaces in a standard manner (i.e., without any changes to the client side functionality).

In some recent operating system releases, a unified device property model is employed to represent system-defined device properties of a connected USB device. For example, in Windows 8, Windows Server 2012 and later releases, the DEVPKEY_Device_SessionId device property (which is a property of the physical device object representing the connected USB device) can be used to indicate to Terminal Services (which is the service in Windows that implements remote sessions) from which sessions the device can be accessed. In particular, if this property does not exist or exists but does not have its value set, the operating system will allow the device to be accessed from any session. If the value is set to a non-zero session identifier, the operating system will allow the device to be accessed only from the session indicated by the session identifier. If the value is set to zero (which is the session identifier for the session in which services run in these later versions of the Windows operating system), the operating system will only allow the device to be accessed by services.

Figure 6A:
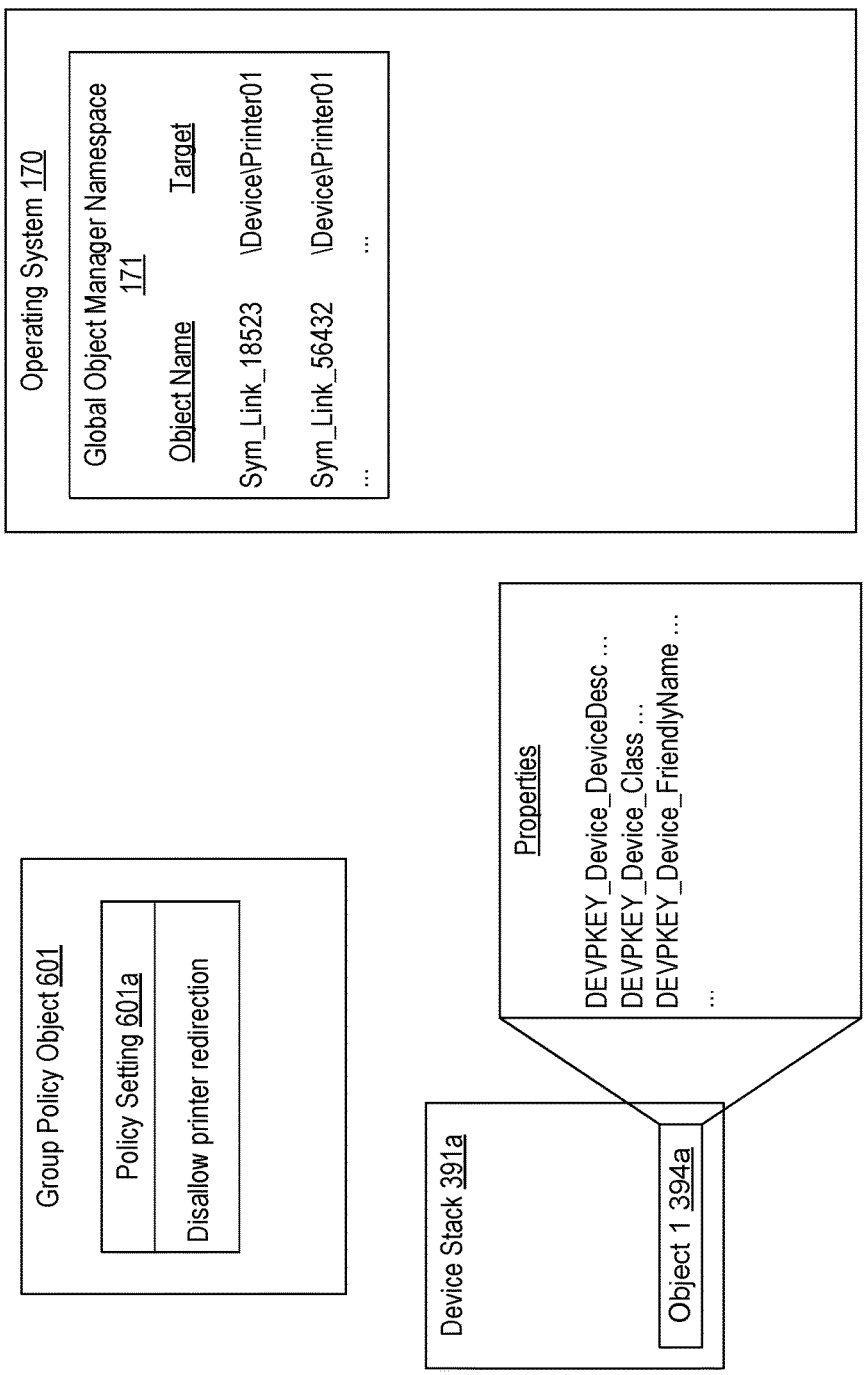
FIGS. 6A and 6B illustrate a process by which a filter driver assigns an invalid session identifier to a session ID property of a device object that specifies from which sessions the underlying device can be accessed.
Figure 6B:
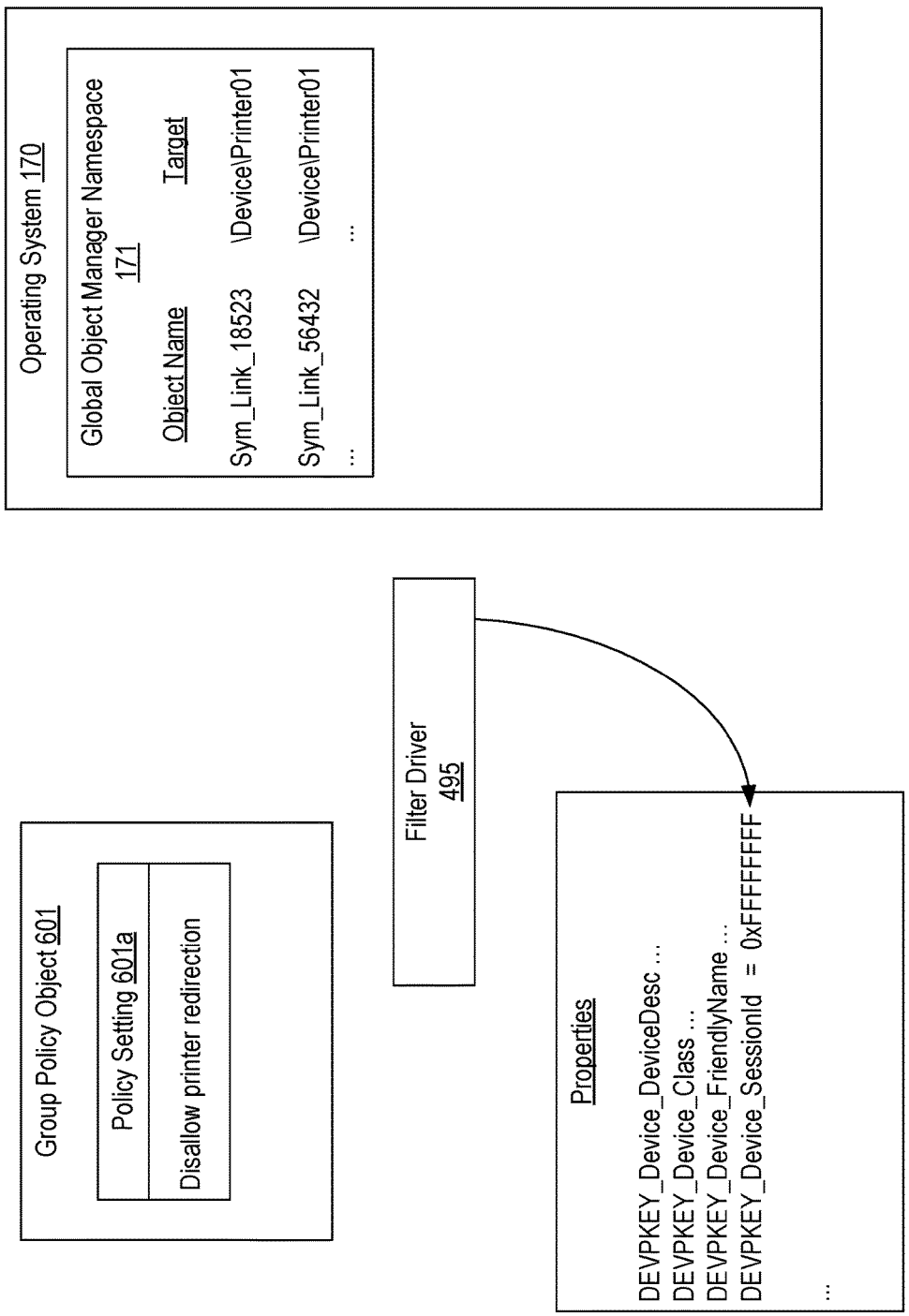

When the operating system of server 104 employs this type of session isolation, the present invention can block a redirected interface of a composite device by manipulating the value of the corresponding DEVPKEY_Device_SessionId. FIGS. 6A and 6B illustrate how this can be accomplished.

In FIG. 6A, Object 1 394a within device stack 391a is represented as including a number of properties in accordance with the unified device property model. For this example, it will be assumed that when object 1 394a is initially created, the DEVPKEY_Device_SessionId property is not included. Therefore, in this current state, operating system 170 would allow virtual device 390a (or printer interface 340a) to be accessed from any session on server 104. FIG. 6A also illustrates that the symbolic links to virtual device 390a have also been created in global object manager namespace 171 thereby making virtual device 390a visible and accessible within each session. However, because it is again assumed that group policy object 601 is applicable to the session used to redirect printer interface 340a, virtual device 390a should not be accessible on server 104.

Therefore, in accordance with embodiments of the present invention, filter driver 495 can modify the properties of object 1 394*a* to include the DEVPKEY_Device_SessionId property having a value representing an invalid session. By assigning an invalid session identifier to the DEVPKEY_Device_SessionId property, virtual device 390*a* will only be accessible within the identified session. However, because the identified session is invalid, there will never be a user session that can access the printer interface.

For example, as shown in FIG. 6B, filter driver 495 has added the DEVPKEY_Device_SessionId property and assigned it a value of 0xFFFFFFFF which is an invalid session identifier in the Windows operating system. Filter driver 495, as a kernel mode driver, can make this modification using the IoSetDevicePropertyData routine. Filter driver 495 could also employ this routine to update the value of the DEVPKEY_Device_SessionId property if it already existed. Although not represented in these figures, filter driver 495 could add/modify the DEVPKEY_Device_SessionId property of any other device object that represents redirected printer interface 340*a*.

By assigning an invalid session identifier to the DEVPKEY_Device_SessionId property of each device object representing redirected printer interface 340*a*, filter driver 495 makes printer interface 340*a* inaccessible to all sessions on server 104. Therefore, even if the symbolic links to printer interface 340*a* remain in global object manager namespace 171 (which is shown in FIG. 6B), operating system 170 will still prevent any session from accessing the printer interface. As with moving the symbolic links to an invalid object manager namespace, assigning an invalid session identifier to the DEVPKEY_Device_SessionId property causes the redirected interface to be blocked in a manner that is independent of the client side functionality.

Figure 7:
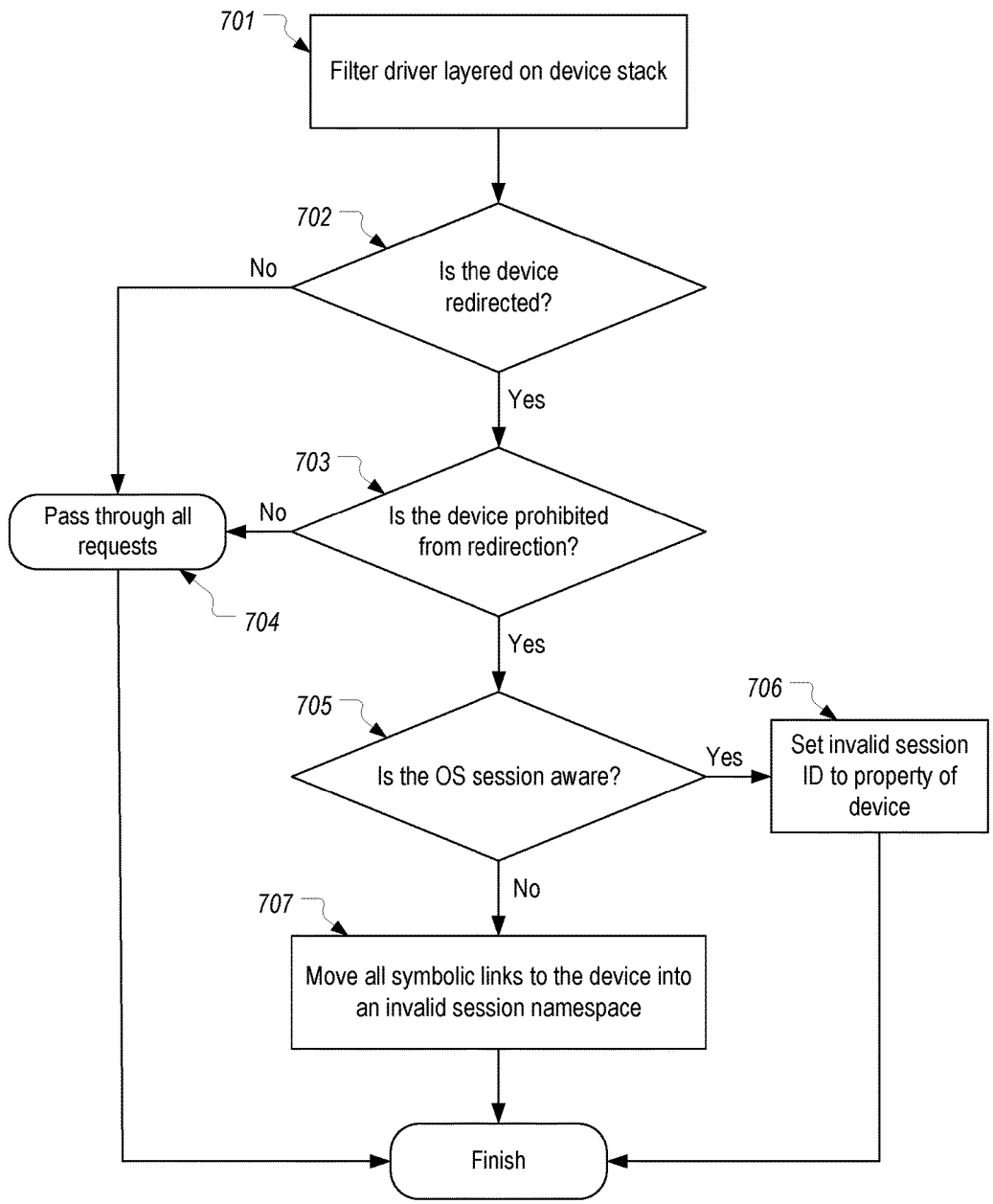
FIG. 7 illustrates a flowchart of a process implemented by a filter driver to selectively block a redirected interface in an appropriate manner.

In some embodiments of the present invention, filter driver 495 can be configured to either assign an invalid session identifier to the DEVPKEY_Device_SessionId property or move the symbolic links to an invalid object manager namespace when it is necessary to block a redirected interface. FIG. 7 illustrates a flowchart of a general process that a filter driver can perform to block a redirected interface in an appropriate manner.

In an initial step 701, and as part of creating the device stack for the device, a filter driver that is configured in accordance with the teachings of the present invention is loaded on the device stack. In step 702, this filter driver determines whether the device is redirected. For example, the filter driver can enumerate the device stack to determine whether a virtual bus driver is present. If the filter driver determines that the device is not redirected, the filter driver can essentially do nothing (i.e., the filter driver can allow the device stack to manage the device in a standard manner by passing through all requests in step 704). However, if the filter driver determines that the device is redirected, it can then determine whether redirection of the device should be allowed in step 703. For example, the filter driver can evaluate any policy applicable to the session over which the device is redirected. If redirection of the device is allowed, filter driver can again essentially do nothing by passing through all requests in step 704.

If, however, redirection of the device is prohibited, the filter driver can determine whether the operating system is session aware in step 705. For example, the filter driver can determine whether the operating system provides a way to specify from which sessions a device may be accessed. If so, in step 706, the filter driver can assign a session identifier of an invalid session to a property of the device (e.g., to the DEVPKEY_Device_SessionId property) so that the device will not be accessible from any valid session. If not, in step 707, the filter driver can move all symbolic links to the device into an object manager namespace of an invalid session so that the device will not be accessible from any valid session.

Although the above description has related primarily to blocking access of a redirected interface of a composite device, the same techniques could be employed to block a redirected non-composite device. The present invention should therefore not be construed as limited to instances where a composite device is redirected. It is again noted, however, that the present invention is particularly beneficial when composite devices are redirected since the redirection of a non-composite device can easily be prevented using existing client side techniques. A primary advantage of the present invention is that it allows an individual interface of a redirected composite device to be rendered inaccessible using server side techniques that are abstracted from the client side redirection functionality.

Figure 8:
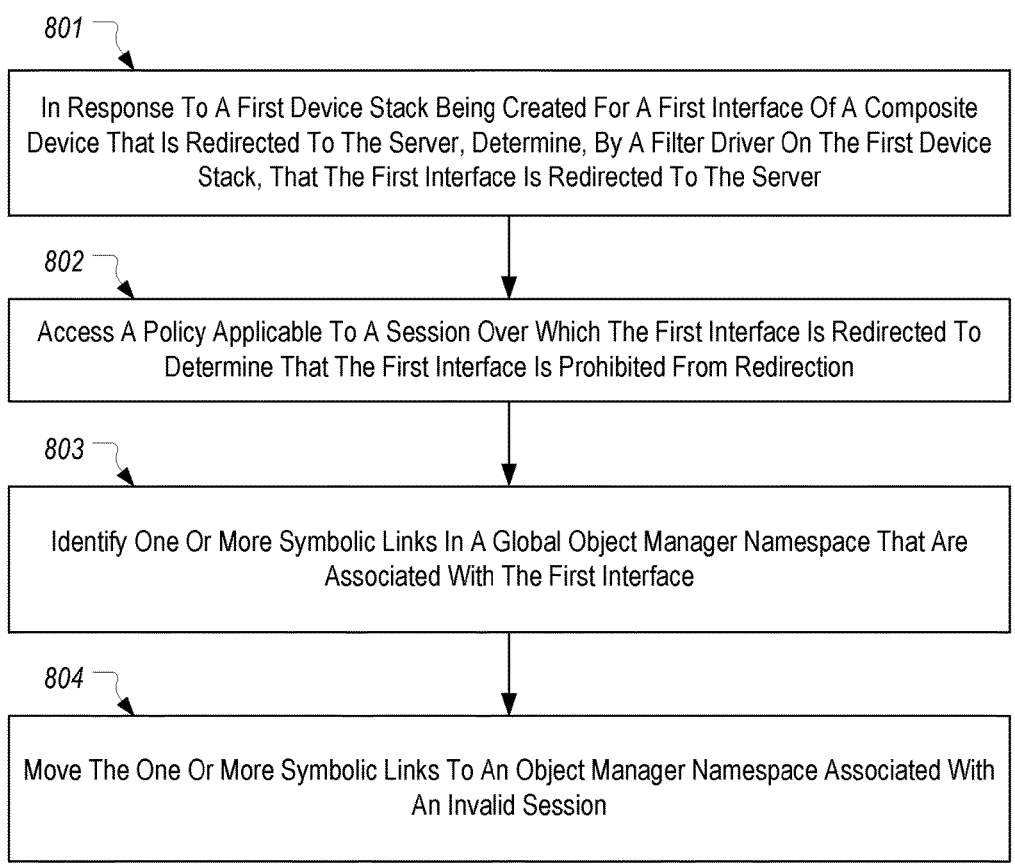
FIG. 8 illustrates a flowchart of an example method for blocking an individual interface of a redirected composite device.

FIG. 8 illustrates a flowchart of an example method 800 for blocking an individual interface of a redirected composite device. As an example, method 800 can be implemented by filter driver 495 or filter drive 497.

Method 800 includes an act 801 of, in response to a first device stack being created for a first interface of a composite device that is redirected to the server, determining, by a filter driver on the first device stack, that the first interface is redirected to the server. For example, filter driver 495, 497 can enumerate the drivers in device stack 391*a*, 391*b* to determine whether virtual bus driver 260 is present.

Method 800 includes an act 802 of accessing a policy applicable to a session over which the first interface is redirected to determine that the first interface is prohibited from redirection. For example, filter driver 495, 497 can access group policy object 601 to determine whether it contains a policy setting that prohibits the redirection of printers or image devices.

Method 800 includes an act 803 of identifying one or more symbolic links in a global object manager namespace that are associated with the first interface. For example, filter driver 495 can identify symbolic links contained in global object manager namespace 171 that are associated with printer interface 340*a*.

Method 800 includes an act 804 of moving the one or more symbolic links to an object manager namespace associated with an invalid session. For example, filter driver 494 can delete the symbolic links from global object manager namespace 171 and add them to local object manager namespace 172 that is associated with an invalid session.

FIG. 9 illustrates a flowchart of another example method 900 for blocking an individual interface of a redirected composite device. As an example, method 900 can be implemented by filter driver 495 or filter drive 497.

Method 900 includes an act 901 of, in response to a first device stack being created for a first interface of a composite device that is redirected to the server, determining, by a filter driver on the first device stack, that the first interface is redirected to the server. For example, filter driver 495, 497 can enumerate the drivers in device stack 391*a*, 391*b* to determine whether virtual bus driver 260 is present.

Method 900 includes an act 902 of accessing a policy applicable to a session over which the first interface is redirected to determine that the first interface is prohibited from redirection. For example, filter driver 495, 497 can access group policy object 601 to determine whether it contains a policy setting that prohibits the redirection of printers or image devices.

Method 900 includes an act 903 of assigning an invalid session ID to a session ID property of a device object representing the first interface such that the first interface will not be accessible within any valid session on the server. For example, filter driver 495 can assign a value of 0xFFFFFFFF to the DEVPKEY_Device_SessionId property of one or more device objects representing printer interface 340a.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for blocking redirection of an individual interface of a USB composite device when the USB composite device is connected to a client terminal that has established a remote session with a server and multiple interfaces of the USB composite device are redirected to the server over the remote session, the method comprising:
   in response to a first device stack being created on the server for a first interface of the USB composite device that is redirected to the server over the remote session established between the client terminal and the server;
   determining, by a first filter driver on the first device stack, that the first interface is redirected to the server;
   accessing, by the first filter driver, a first policy applicable to the remote session to determine that the first interface is prohibited from redirection to the server;
   identifying, by the first filter driver, one or more symbolic links in a global object manager namespace that have a device target matching the first interface; and
   moving, by the first filter driver, the one or more symbolic links to an object manager namespace that is not associated with any user session on the server to thereby prevent the first interface from being accessed from any user session;
   in response to a second device stack being created on the server for a second interface of the USB composite device that is redirected to the server over the remote session established between the client terminal and the server;
   determining, by the second filter driver, that the second interface is redirected to the server;
   accessing, by the second filter driver, a second policy to determine that the second interface is not prohibited from redirection to the server; and
   allowing, by the second filter driver, the second interface to be redirected to the server via the second device stack thereby making the second interface accessible to the client terminal within the remote session.

2. The method of claim 1, wherein determining that the first and second interfaces are redirected to the server comprises enumerating drivers in the first and second device stack respectively to identify the presence of a virtual bus driver.

3. The method of claim 1, wherein one or both of the first and second policy comprises an Active Directory group policy object.

4. The method of claim 1, wherein the one or more symbolic links comprise multiple symbolic links.

5. The method of claim 1, wherein identifying the one or more symbolic links in the global object manager namespace that have a device target matching the first interface comprises enumerating one or more device objects in the first device stack to identify any symbolic links associated with the one or more device objects.

6. The method of claim 1, further comprising: identifying one or more symbolic links in one or more local object manager namespaces have a device target matching the first interface; and
   moving the one or more symbolic links in the one or more local object manager namespaces to an object manager namespace that is not associated with any user session on the server.

7. The method of claim 1, wherein moving the one or more symbolic links to the object manager namespace that is not associated with any user session on the server comprises deleting the one or more symbolic links from the global object manager namespace and adding the one or more symbolic links to the object manager namespace that is not associated with any user session on the server.

8. The method of claim 1, further comprising: prior to identifying the one or more symbolic links in the global object manager namespace that have a device target matching the first interface, determining that an operating system of the server does not allow the first interface to be associated with a property that defines from which sessions the first interface may be accessed.

9. The method of claim 1, wherein the first policy and the second policy are the same policy.

10. The method of claim 1, wherein determining that the first interface is prohibited from redirection to the server comprises determining that the first policy prohibits redirection of a class of devices and that the first interface matches the class.

11. A method for blocking redirection of an individual interface of a USB composite device when the USB composite device is connected to a client terminal that has established a remote session with a server and multiple interfaces of the USB composite device are redirected to the server over the remote session, the method comprising:
- in response to a first device stack being created on the server for a first interface of the USB composite device that is redirected to the server over the remote session established between the client terminal and the server, determining, by a first filter driver on the first device stack, that the first interface is redirected to the server;
- in response to a second device stack being created on the server for a second interface of the USB composite device that is redirected to the server over the remote session established between the client terminal and the server, determining, by a second filter driver on the second device stack, that the second interface is redirected to the server;
- accessing, by both the first and second filter drivers, a policy applicable to the remote session over which the first and second interfaces are redirected;
- determining, by the first filter driver, that the policy does not prohibit redirection of the first interface, and in response, allowing the first interface to be redirected to the server via the first device stack thereby making the first interface accessible to the client terminal within the remote session; and
- determining, by the second filter driver, that the policy prohibits redirection of the second interface;
- determining whether an operating system of the server allows device objects to include a session ID property to define from which sessions corresponding devices can be accessed;
- when it is determined that the operating system of the server allows device objects to include a session ID property to define from which sessions the corresponding devices can be accessed, assigning an invalid session ID that is not associated with any user session on the server to a session ID property of a device object representing the second interface to thereby prevent the second interface from being accessed from any user session; and
- when it is determined that the operating system of the server does not allow device objects to include a session ID property to define from which sessions the corresponding devices can be accessed, moving any symbolic link that has a device target matching the second interface to an object manager namespace that is not associated with any user session on the server to thereby prevent the second interface from being accessed from any user session.

12. The method of claim 11, wherein the session ID property is the DEVPKEY_Device_SessionId property in the Windows operating system such that the invalid session ID is assigned to the DEVPKEY_DEVICE_SesssionId property.

13. The method of claim 12, wherein the DEVPKEY_Device_SessionId property is assigned a value of 0xFFFFFFFF.

14. The method of claim 11, wherein determining that the first and second interfaces are redirected to the server comprises enumerating drivers in the first and second device stack respectively to identify the presence of a virtual bus driver.

15. The method of claim 11, wherein the policy comprises an Active Directory group policy object.

16. The method of claim 11, wherein moving any symbolic link that has a device target matching the second interface comprises enumerating one or more device objects in the second device stack to identify any symbolic links associated with the one or more device objects.

17. The method of claim 11, wherein determining that the first and second interfaces are redirected to the server comprises enumerating drivers in the first and second device stack respectively to identify the presence of a virtual bus driver.

18. The method of claim 11, wherein determining that the second interface is prohibited from redirection comprises determining that the policy prohibits redirection of a class of devices and that the second interface matches the class.

19. One or more non-transitory computer storage media storing computer executable instructions which when executed on a server implement a method for blocking redirection of an individual interface of a USB composite device when the USB composite device is connected to a client terminal that has established a remote session with a server and multiple interfaces of the USB composite device are redirected to the server over the remote session, the method comprising:
- in response to a first device stack being created on the server for a first interface of the USB composite device that is redirected to the server over the remote session established between the client terminal and the server, determining, by a first filter driver on the first device stack, that the first interface is redirected to the server;
- in response to a second device stack being created on the server for a second interface of the USB composite device that is redirected to the server over the remote session established between the client terminal and the server, determining, by a second filter driver on the second device stack, that the second interface is redirected to the server;
- accessing, by both the first and second filter drivers, a policy applicable to the remote session over which the first and second interfaces are redirected;
- determining, by the first filter driver, that the policy does not prohibit redirection of the first interface, and in response, allowing the first interface to be redirected to the server via the first device stack thereby making the first interface accessible to the client terminal within the remote session; and
- determining, by the second filter driver, that the policy prohibits redirection of the second interface, determining whether an operating system of the server allows device objects to include a session ID property to define from which sessions corresponding devices can be accessed;

when it is determined that the operating system of the server allows device objects to include a session ID property to define from which sessions the corresponding devices can be accessed, assigning an invalid session ID that is not associated with any user session on the server to a session ID property of a device object representing the second interface to thereby prevent the second interface from being accessed from any user session; and when it is determined that the operating system of the server does not allow device objects to include a session ID property to define from which sessions the corresponding devices can be accessed, moving any symbolic link that has a device target matching the second interface to an object manager namespace that is not associated with any user session on the server to thereby prevent the second interface from being accessed from any user session.

20. The non-transitory computer storage media of claim 19, wherein determining that the first and second interfaces are redirected to the server comprises enumerating drivers in the first and second device stack respectively to identify the presence of a virtual bus driver.

* * * * *